Figure 1:
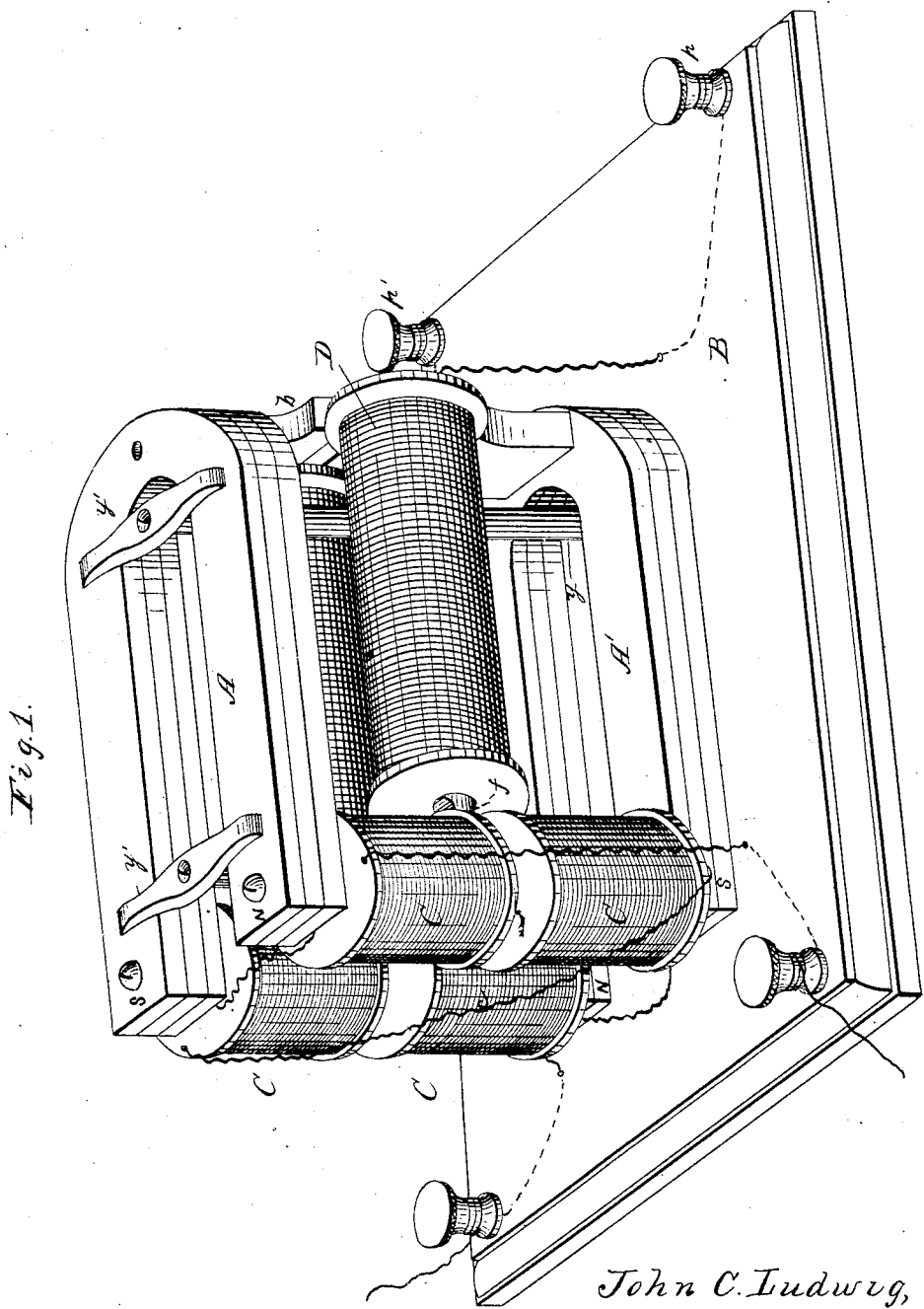

(No Model.) 3 Sheets—Sheet 1.

J. C. LUDWIG.
INDUCTION APPARATUS FOR TELEGRAPHY.

No. 315,425. Patented Apr. 7, 1885.

WITNESSES

John C. Ludwig,
INVENTOR.

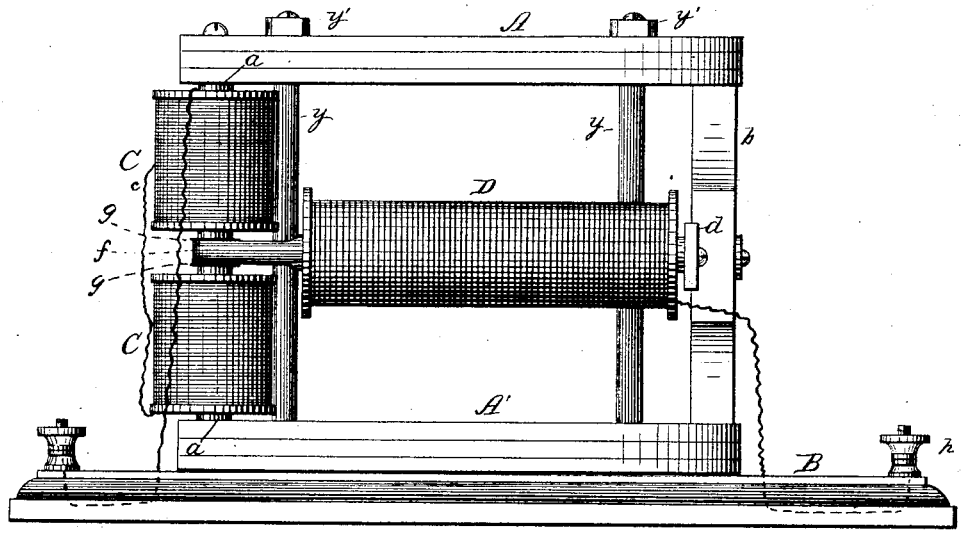
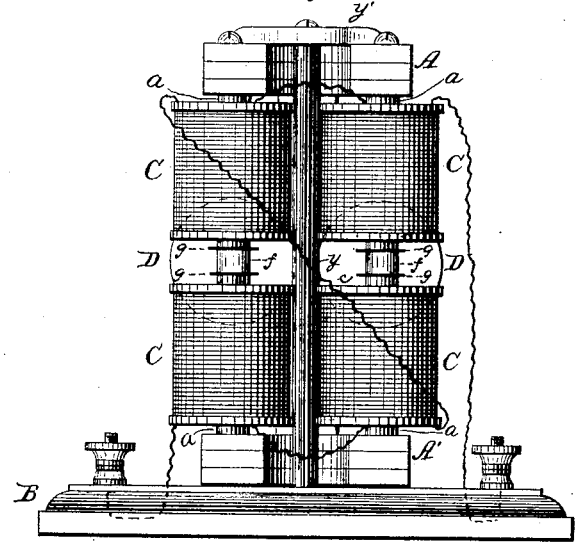

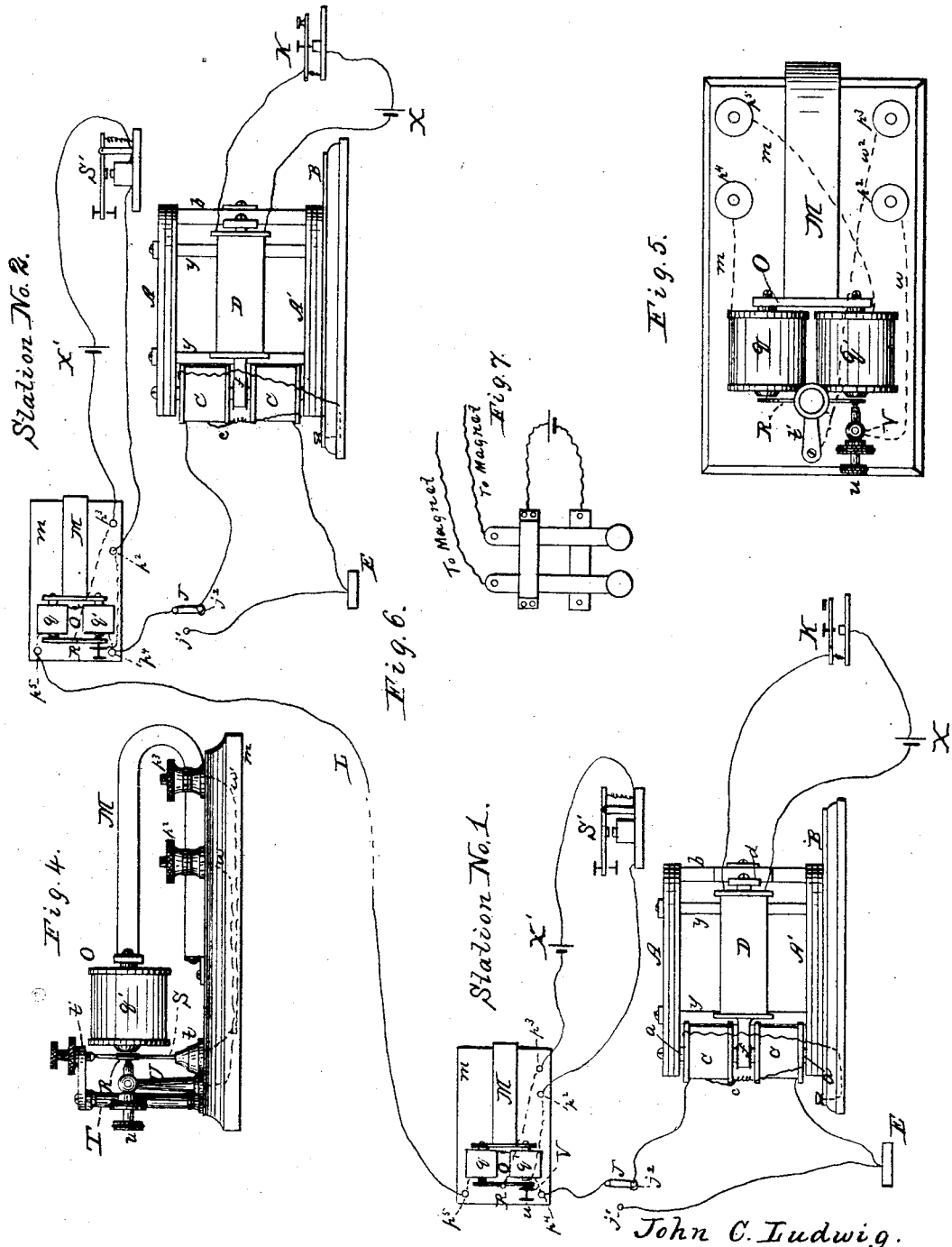

UNITED STATES PATENT OFFICE.

JOHN C. LUDWIG, OF SAN FRANCISCO, CALIFORNIA, ASSIGNOR OF THREE-FOURTHS TO LOUIS A. GARNETT, OF SAME PLACE, AND JOHN HEWSTON, JR., OF BROOKLYN, CALIFORNIA.

INDUCTION APPARATUS FOR TELEGRAPHY.

SPECIFICATION forming part of Letters Patent No. 315,425, dated April 7, 1885.

Application filed June 23, 1884. (No model.)

*To all whom it may concern:*

Be it known that I, JOHN C. LUDWIG, a citizen of the United States, residing at the city and county of San Francisco, and State of California, have invented a new and useful Improvement in Electric Telegraphy, of which the following is a specification.

My invention relates to an apparatus for producing and transmitting electric currents for telegraphic purposes, its object being to provide strong and highly efficient currents for this purpose, while obviating the maintenance of large and continuously-expensive voltaic batteries or ponderous power-driven mechanical generators. The currents I use are produced by magnetic induction, and are different from those produced by ordinary induction - coils, which have heretofore been used in telegraphy; but while the currents of my system have a character similar to that of currents from magneto or dynamo electric machines, the mode of their production is vastly different in that there is in it required no movement of any part of the generator, the simple making and breaking of a circuit of a small battery by means of an ordinary transmitting-key serving to magnetize and demagnetize an electro - magnet, which by its alternations of condition effects in suitable adjacent coils surrounding magnetic cores the induction of the currents which traverse the line-wire alternately in opposite directions and actuate relays or other receiving-instruments constructed for operation by such reversed currents.

In what my improvement consists will be readily understood from the following particular description and definite claims, in connection with the accompanying drawings, in which—

Figure 1 is a perspective view of a current generating and transmitting apparatus constructed according to my invention. Fig. 2 is a side elevation, and Fig. 3 an end elevation, of the same. Fig. 4 is a side elevation of a preferred form of receiving-instrument. Fig. 5 is a top view of the same. Fig. 6 is a diagram illustrating a system of telegraphy comprising my invention. Fig. 7 is a side view of a current-reversing key.

Referring to Figs. 1, 2, and 3, the letters A and A' indicate two permanent magnets of the ordinary horseshoe form, arranged flatwise with relation to each other, and at a suitable distance apart, one being above the other in the present instance, though such relative positions are non-essential. Between the permanent magnets, near their curved ends, stands a block of wood, $b$, or other isolating material, which serves to keep them separated a proper distance at their ends. Each pole of both permanent magnets is provided with a laterally-projecting soft-iron pole-piece, $a$, the pole-pieces of one magnet extending toward those of the other and separated therefrom a suitable distance. Each pole-piece is surrounded by a coil, C, of insulated fine wire about the size, preferably, of ordinary Morse relay-wire. The coils of each magnet are connected in a pair by their inner terminals, and the two pairs are connected together between two similar outer terminals, as shown by the wire $c$—that is, the coil on one south pole-piece has its outer extremity connected to the outer extremity of the coil on the other south pole-piece. The outer extremities of the other two coils are to be connected to earth E and the line L, respectively. The coils are all similar in their winding, and the manner of their connection brings the winding in proper relation to the respective pole-pieces. For instance, if a current in a given direction should enter a coil of one magnet by its outer extremity, it would leave by its inner extremity and pass to the inner extremity of the opposite coil of the same magnet, and then leaving this coil by its outer extremity it passes to the outer extremity of the similarly-situated coil of the other magnet. By this arrangement induced currents simultaneously produced in all the coils by the north and south pole-pieces are caused to flow in the same direction, while if the coils were connected so that the outer extremity of one joined the inner extremity of another, the simultaneous inductive influences of opposite poles would neutralize each other in the coils and no current would flow.

The letter D indicates an electro-magnet having coils of large wire, so that its cores will be promptly and efficiently magnetized when said coils are traversed by an electric current. The yoke-piece $d$ of the cores of this electro-magnet is fastened to the block $b$, and the polar portions of said cores, as shown clearly at $f$ in Fig. 2, are somewhat flattened and extend between the tips of the opposed pole-pieces of the permanent magnets, being prevented from touching said pole-pieces, however, by thin interposed plates $g$ of isolating material, such as hard rubber, wood, or paper. One of the coil terminals of the electro-magnet D is connected to a binding-post, $p$, and the other to a similar post, $p'$, on base-board B.

The apparatus is secured to the base-board by suitable bolts, $y$, and bars $y'$. The binding-post $p$ is connected with one pole of a small voltaic battery, X, the other pole of which is connected with the anvil or circuit-closing contact of an ordinary transmitting-key, K, the key itself being connected with the binding-post $p'$.

The permanent magnets A and A' have poles of opposite character arranged opposite each other—that is, the tip of the north pole-piece of each magnet faces and is adjacent to the tip of the south pole-piece of the other magnet, and in the space between each opposed pair of tips, and also in a limited contiguous space, is comprised an intense magnetic field. If a piece of soft iron or a magnet were moved through this field athwart and between the opposed polar tips, currents would be induced in the coils; but with a view to obviating the necessity of moving an armature with relation to the pole-pieces I have arranged permanently between the soft-iron poles of the electro-magnet D the poles of an electro-magnet D, and I have found that alternate magnetization and demagnetization of the cores of this latter electro-magnet effect in an increased degree the purpose which would be accomplished by moving an armature through or alternately into and out of the magnetic field. In other words, the intermittent magnetization of the electro-magnet, or, better still, reversing its magnetic polarity by currents alternately in opposite directions through its coils, results in the induction of very powerful currents alternately in opposite directions in the coils of fine wire C which surround the pole-pieces of the permanent magnets, the strength of such currents depending, first, on the strength of the permanent magnets; secondly, on the size of the wire used on the spools C; and, thirdly, on the battery-power used. The stronger the permanent magnets the more intense the currents produced, and the intensity is also enhanced in proportion as the wire of the spools is finer. A single small-sized bichromate-of-potassium cell is sufficient battery for all ordinary purposes, and will produce a proper magnetization to induce a current sufficient to overcome a resistance of more than forty thousand ohms, which is the resistance of about two thousand miles of No. 10 galvanized iron wire, such as commonly used in practical telegraphy.

It will, of course, be understood that in using the reversed currents produced by my generator for telegraphing by the Morse code a suitable receiving-instrument must also be used, and such an instrument I have illustrated in Figs. 4 and 5, in which M designates a permanent magnet of horseshoe shape, with one limb attached to a base-board, $m$, and the other lying above it. Directly to the pole of this upper limb is secured the yoke-piece of a small electro-magnet, O, the coils $q\ q'$ of which have soft-iron cores, to which, of course, is communicated a magnetic polarity the same as that of the permanent magnet-pole to which their yoke-piece is attached. In front of the poles of this small electro-magnet is an equal-armed oscillating armature, R, the middle of which is fastened to a vertical arbor, S, which is stepped in a bearing, $t$, at its foot, and has a top bearing in the overhanging arm $t'$ of a metal post, T. Behind one end of the armature R is arranged an adjustable contact-screw, $u$, supported in a metal post, U. The metallic step-bearing $t$ and post T are connected by a wire, $w$, (shown in dotted lines, Fig. 5,) with a binding-post $p^2$ and the post U is connected by a wire, $w'$, (also shown in dotted lines,) with a binding-post, $p^3$. To these two binding-posts $p^2\ p^3$ are to be connected, respectively, the wires of a local circuit, including a local battery, X', and a sounder, S', as shown in the diagram, Fig. 6. One coil terminal of the small electro-magnet O is connected to a binding-post, $p^4$, and the other to a similar post, $p^5$. In Fig. 6 the post $p^5$ is shown connected with the line-wire L, and the post $p^4$ is connected with a switch, J, which may be swung to contact with either of two contact-buttons, $j'$ or $j^2$, the former being connected directly to earth, while the latter is connected to earth through the coils C of the generator.

The armature R of the relay is entirely neutral and made of soft iron. It is arranged quite close to the poles of the electro-magnet O, and when no current traverses the coils of said magnet it will be attracted equally at both ends, and if either end is pressed closer to one pole than the other the armature will remain in such position as long as no current passes, and also while a current in a given direction is passing, as will presently be explained.

Referring now to the diagram, Fig. 6, I will explain the operation of my invention, recurring also occasionally to some of the other figures. In the diagram I have indicated two telegraph-stations by name, as "Station No. 1" and "Station No. 2." The sets of apparatus at the two stations are precisely alike, each set comprising a generating and transmitting instrument, a transmitting-key and battery connected therewith, a relay and local battery circuit, including a sounder and a switch, and connections by which the relay may be connected directly to earth, or to earth through the coils C of the generator. The relays at the two stations are connected by the line-wire L. Ordinarily, when the line is not in use, the switch J will be turned to contact with button $j'$ at each station, thus connecting the relays directly to earth and removing the resistance of the generator-coils from the line. Now, suppose station No. 1 desires to send a message to station No. 2. The first step is to turn the switch J at station No. 1 to contact with button $j^2$, thus putting the generator and transmitter to line. Then by operating key K at station No. 1 a signal for calling station No. 2 is sent and received at the latter station by means of its relay and sounder, as its relay is connected to ground. At station No. 1, after sending the call, the generator is preferably removed temporarily from the line, (though not necessarily,) which should be connected directly to earth while the answer to the call is awaited. The answer having announced that station No. 2 is ready to receive the message, the generator at station No. 1 is again connected to line, and the operator, by using the key K in the usual manner, may send his message according to the ordinary Morse code. If a simple make-and-break key is used, each time it is depressed and the circuit of battery X closed the cores of electro-magnet D will be magnetized, and by their action on the magnetic field and the cores of spools C there will be induced in said spools a current which will pass, say, from the spools to line, and also from earth through the spools. When the key is opened and the cores of magnet D demagnetized, a reverse current traverses the line and spools. Now, we will suppose that in the construction of the relays the electro-magnets O are attached to the north poles of the permanent magnets M, and a north polarity is consequently communicated to the soft-iron cores of said electro-magnets. Suppose, further, that the induced current generated and sent on the line as the result of closing the key flows in such direction through the coils of the relay electro-magnets that, were the cores of said magnets neutral, the current would give to core of spool $q$ a north polarity and to core of spool $q'$ a south polarity. Now, it is obvious that as the cores already have a north polarity the effect of the current will be to make stronger the north polarity of core of coil $q$, and weaken, if not altogether neutralize, that of core of coil $q'$, so that the core of coil $q$ will have the strongest attraction for the armature R and will draw the adjacent end of said armature toward it, throwing the other end out against the contact-screw $u$, and thus closing the local circuit and operating the sounder at both stations. No reverse current will flow until the key is opened, (although the magnetizing effect of the direct current will cease almost instantly,) and consequently the armature will remain attracted by the pole to which it is nearest until the key is opened, and will keep the local circuit closed meantime. As soon, however, as the key is opened the demagnetization of the cores of electro-magnet D causes a reverse current to traverse the line and coils of the relay, and this reverse current weakens the power of the cores of coils $q$ and re-enforces that of cores of coils $q'$, so that the armatures R are drawn away from the contact-screws $u$, the local circuits are opened, and the sounders make a back-stroke. It will thus be seen that the intervals of movement of the relay-armatures may be made to correspond to the "dots" and "dashes" of the Morse code of signals.

It will be observed that but one pole of the permanent magnet is made use of in my relay, the other pole not being made use of to magnetize the armature, as in the ordinary polarized relay. If the armature of my relay were magnetized, the instrument would be inoperative, as the end corresponding to, or, rather, having opposite polarity to, that of the coil-cores would be always attracted, and that delicate balance of power between the two cores, upon which the prompt and vigorous action of the relay depends, would be destroyed. This relay may be disconnected from a local circuit and used as a sounding receiver directly. It will be made the subject of a separate application for patent.

I have intimated that instead of simply making and breaking the circuit through the coils of electro-magnet D of the generator the currents may be reversed through said coils. In Fig. 7 I show a current-reversing key which may be used for this purpose. Its operation is obvious, and will not therefore be particularly explained.

I would further say, and it will be readily understood, that my invention, as respects the generator and transmitter, is not limited to any particular number of pairs of opposing pole-pieces and coils. There may be but one pair, or any convenient number more than two, as shown, it being only necessary that the system of connecting the coils which I have indicated shall be followed.

Having now fully described my invention and explained the operation thereof, I claim—

1. In an electric-current generating and transmitting instrument, the combination, with one or more pairs of magnetically-polarized cores having opposing poles adjacent to each other, of coils of wire surrounding said cores and connected, as described, and a stationary electro-magnet having a pole inductively adjacent to but separated from the poles of each opposing pair of said cores, substantially as described.

2. In an electric-current generating and transmitting apparatus, the combination of two permanent magnets arranged at a proper distance apart and having soft-iron pole-pieces of opposite character projecting toward each other, coils of wire surrounding said pole-pieces and connected to give uniformity of direction to currents resulting from induction of opposite magnet-cores, and a stationary electro-magnet having its soft-iron core or cores inductively adjacent to the poles of each pair of opposed pole-pieces, substantially as described.

3. In an electric-current generating and transmitting instrument, the combination of the permanent magnets A A', having soft-iron pole-pieces of opposite character extending toward each other, the coils surrounding said pole-pieces and connected together, as described, and the stationary electro-magnet D, having the polar portions of its cores inserted between and isolated from the opposing pole-pieces, substantially as described.

4. The combination, in an inductive electric generator, of two magnetically-polarized cores having poles adjacent to each other, coils of wire surrounding said cores, and a stationary electro-magnet having a polar portion of its core inductively adjacent to said cores, substantially as described.

5. The combination, with the magnetically-polarized cores, the surrounding connected coils, and the stationary electro-magnet with polar portions or a polar portion adjacent to the poles of said cores, of suitable means for causing an intermittent flow of electricity through the coils of said electro-magnet, substantially as described.

In witness whereof I have hereunto set my hand.

JOHN C. LUDWIG.

Witnesses:
I. L. CULIN,
JESSE WALTON.